United States Patent
Hayashi

(10) Patent No.: US 6,781,625 B2
(45) Date of Patent: Aug. 24, 2004

(54) NOISE REDUCING APPARATUS

(75) Inventor: Kenkichi Hayashi, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/387,481

(22) Filed: Mar. 14, 2003

(65) Prior Publication Data

US 2003/0174223 A1 Sep. 18, 2003

(30) Foreign Application Priority Data

Mar. 15, 2002 (JP) .......................................... 2002-071243

(51) Int. Cl.$^7$ ............................................. H04N 5/208
(52) U.S. Cl. ...................... 348/252; 348/241; 386/114; 382/268; 378/98.2
(58) Field of Search ................................ 348/241, 533, 348/571, 606, 607, 609, 618, 627, 252; 378/98.12; 382/268, 296, 270, 260, 261, 262, 266; 386/113, 116, 114, 76

(56) References Cited

U.S. PATENT DOCUMENTS

| | | | | |
|---|---|---|---|---|
| 4,334,244 A | * | 6/1982 | Chan et al. | ................. 348/606 |
| 5,912,826 A | * | 6/1999 | Bangham et al. | ........... 708/300 |
| 5,926,577 A | * | 7/1999 | Kasahara et al. | ........... 382/266 |
| 5,933,540 A | * | 8/1999 | Lakshminarayanan et al. | .. 382/260 |

* cited by examiner

*Primary Examiner*—Andrew Christensen
*Assistant Examiner*—Brina Genco
(74) *Attorney, Agent, or Firm*—Birch, Stewart, Kolasch & Birch, LLP

(57) ABSTRACT

First and second noise detecting circuits detect whether image data output from a signal processing circuit includes noise. If the image data includes noise, first and second noise reducing circuits reduce the noise. An edge extracting circuit extracts edge data from the first image data in which noise has been reduced. An adding circuit adds the edge data and second image data, which has been output by the second noise reducing circuit, and outputs the resultant data. Even though edge enhancement is applied, noise is not enhanced but noise is reduced.

8 Claims, 4 Drawing Sheets

NOISE REDUCING APPARATUS

This nonprovisional application claims priority under 35 U.S.C. §119(a) on Patent Application No(s). 2002-071243 filed in JAPAN on Mar. 15, 2002, which is (are) herein incorporated by reference.

BACKGROUND OF THE INVENTION

1. Field of the Invention

This invention relates to an apparatus for reducing noise in an image signal.

2. Description of the Related Art

When a CCD has a large number of pixels, the area per pixel is small. Since the amount of signal obtained from a single pixel is small, the amount of noise is great. There are instances where filtering is applied to an image signal in order to reduce noise. If filtering is applied to image signals indiscriminately, however, image quality declines. Further, edge enhancement often is performed in order to raise the apparent image quality of an image. However, edge emphasis processing enhances noise as well.

SUMMARY OF THE INVENTION

An object of the present invention is to make image noise less noticeable.

According to the present invention, the foregoing object is attained by providing a noise reducing apparatus comprising a first noise reducing circuit (means), to which a noise-reduction-target image signal (inclusive of not only an analog signal but also digital image data) representing an image to undergo noise reduction is input, for reducing a noise component and outputting a resultant first image signal; an edge extracting circuit (means) for extracting an edge signal from the first image signal output from the first noise reducing circuit; and an adding circuit (means) for adding the edge signal, which has been extracted by the edge extracting circuit, and the noise-reduction-target image signal and outputting the result.

A control method suited to the above-described noise reducing apparatus according to the present invention also is provided. Specifically, the method comprises the steps of inputting a noise-reduction-target image signal, which represents an image to undergo noise reduction, to a noise reducing circuit (means); obtaining a first image signal in which a noise component has been reduced; extracting an edge signal from the first image signal output from the noise reducing circuit; and adding the edge signal extracted and the noise-reduction-target image signal.

In accordance with the present invention, the noise component is reduced in a noise-reduction-target image signal, which represents an image to which noise reduction is to be applied, whereby a first image signal is obtained. An edge signal representing the edge of the image is extracted from the first image signal obtained. The edge signal extracted and the noise-reduction-target image signal are added.

Since the edge signal is extracted from the first image signal, which has already undergone noise reduction, the noise component will already have been reduced. Accordingly, even though edge enhancement processing is executed by adding the edge signal to the noise-reduction-target image signal, it is possible to prevent noise from being enhanced by edge emphasis. Noise can be reduced while improving apparent image quality by edge emphasis.

The apparatus may further comprise a second noise reducing circuit (means), to which the noise-reduction-target image signal is input, for reducing a noise component and outputting a resultant second image signal (the first noise reducing circuit and the second noise reducing circuit may be the same circuit). In this case, the adding circuit would add the edge signal, which has been extracted by the edge extracting circuit, and the second image signal and output the result.

Since the noise component of the noise-reduction-target image signal per se is reduced, image noise becomes less noticeable. Moreover, since edge emphasis processing is executed by adding the edge signal to the second image signal in which noise has been reduced, the apparent image quality is improved by edge emphasis and it is possible to prevent a decline in the quality of an image represented by the signal output from the adding circuit.

The first noise reducing circuit or the second noise reducing circuit may be so adapted that the extent to which the noise component is reduced can be adjusted.

It is also possible to so arrange it that an edge signal is extracted from the noise-reduction-target image signal and processing is executed for reducing the noise component of the edge signal extracted. The edge signal in which the noise component has been reduced and the noise-reduction-target image signal are added.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the drawings.

Figure 1:
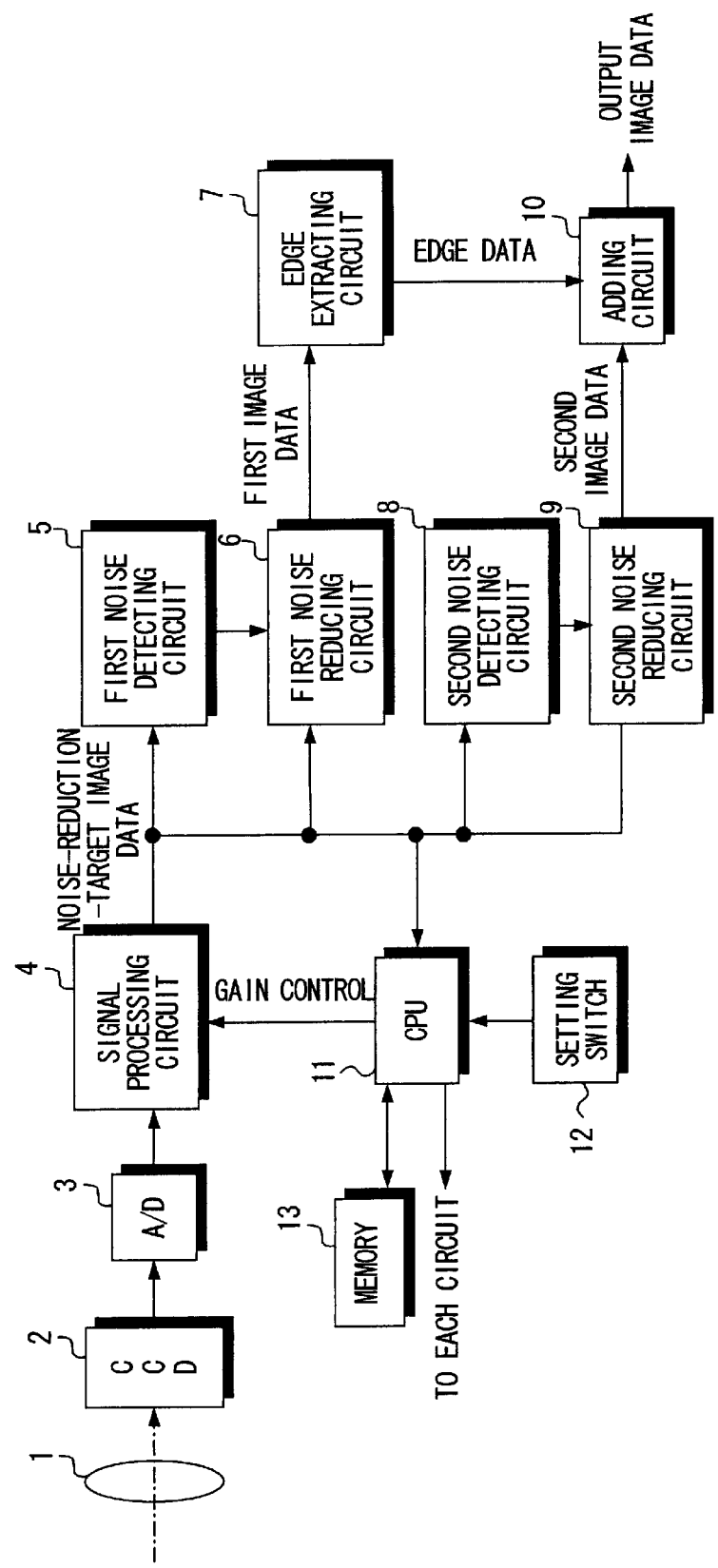
FIG. 1 is a block diagram illustrating part of the electrical structure of a digital still camera according to a preferred embodiment of the present invention.

FIG. 1 is a block diagram illustrating part of the electrical structure of a digital still camera according to a preferred embodiment of the present invention, and FIGS. 2(A) to (D) show examples of data that flow through the circuit of FIG. 1.

The overall operation of the digital still camera is controlled by a CPU 11.

The digital still camera is such that the level of image data obtained by imaging can be adjusted (gain can be controlled) in accordance with a setting. A setting switch 12 is included in the digital still camera in order to set the level. The setting signal output from the setting switch 12 is input to the CPU 11. The CPU 11 applies a gain control signal to a signal processing circuit 4, which proceeds to adjust the level of the image data.

A memory 13 is connected to the CPU 11. As will be described later, a threshold value used in noise reduction processing is stored in the memory 13 in accordance with a gain control value.

The image of a subject is formed on the photoreceptor surface of the CCD 2 by an imaging lens 1, and the CCD2 outputs a video signal representing the image of the subject. The video signal is converted to digital image data by an analog/digital converter circuit 3, and the digital image data is input to the signal processing circuit 4.

The signal processing circuit 4, in addition to adjusting the level of the image data as mentioned above, executes signal processing such as a gamma correction and color balance adjustment. The image data output from the signal processing circuit 4 is input to the CPU 11, a first noise detecting circuit 5, a first noise reducing circuit 6, a second noise detecting circuit 8 and a second noise reducing circuit 9. [The image output from signal processing circuit 4 shall be referred to as "noise-reduction-target image data". See FIG. 2(A). Here a noise component is indicated by N.]

Noise reduction processing in this embodiment is executed as set forth below.

Figure 3:
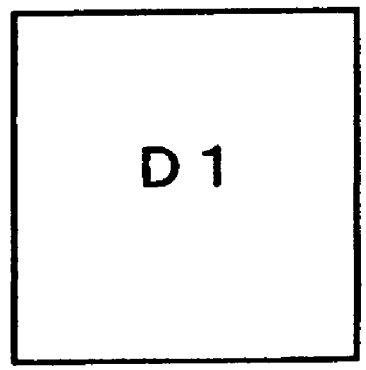
FIG. 3 illustrates the relationship between a pixel to undergo noise reduction and pixels above and below this pixel.
Figure 3:
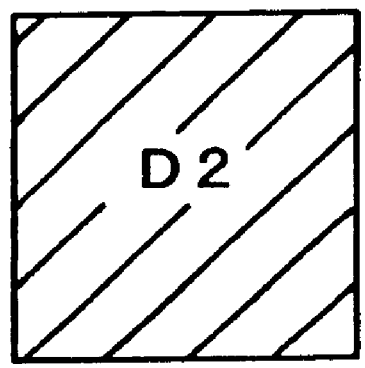
Figure 3:
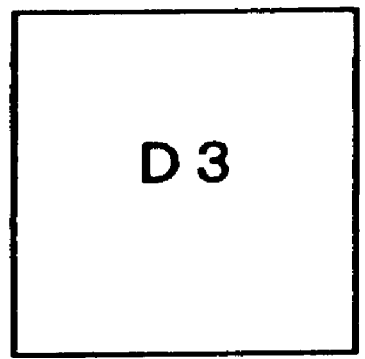

Consider three contiguous pixels D1, D2 and D3 in the vertical direction, as shown in FIG. 3. A pixel to undergo noise reduction is the central pixel D2 (indicated by hatching) among these three pixels D1, D2 and D3. An average level avg of these three pixels D1, D2, D3 is calculated in accordance with Equation (1) below. In Equation (1), the levels of the three pixels D1, D2 and D3 are represented by D1, D2 and D3, respectively.

$$avg=(D1+D2+D3)/3 \qquad \text{Equation (1)}$$

A value val representing the disparity of the level of the noise-reduction target pixel D2 from the average level avg is calculated in accordance with Equation (2) below.

$$val=D2-avg \qquad \text{Equation (2)}$$

If the value val obtained from Equation (2) is greater than a threshold value, then the level of the pixel D2 is much greater than the levels of the upper and lower pixels D1 and D3. Accordingly, this is construed to be indicative of an edge, the noise-reduction target pixel D2 is judged not to be noise and data representing the entered value of the noise-reduction target pixel D2 per se is output ($D2_{out}=D2$). If the value val obtained from Equation (2) is smaller than the threshold value, noise is judged to be present. Data representing the average level is output as the image data of the noise-reduction target pixel D2 ($D2_{out}=avg$) and, hence, noise is reduced.

The calculations of Equations (1) and (2) described above are performed by the first noise detecting circuit 5. If the result of the calculations is that the value val is less than the threshold value (the threshold value is a value that conforms to the gain set by the user; the corresponding threshold value is read out of the memory 13 and applied to the first noise detecting circuit 5), a signal indicative of noise is applied to the first noise reducing circuit 6 from the first noise detecting circuit 5. As a result, the first noise reducing circuit 6 executes the average-level calculation processing in accordance with Equation (1) and outputs data, which represents the average level avg, as data of the target pixel D2. If the result of the calculations is that the value val is greater than the threshold value, a signal indicating absence of noise is applied to the first noise reducing circuit 6 from the first noise detecting circuit 5. As a result, the first noise reducing circuit 6 outputs data representing the target pixel D2 per se as the data of the target pixel D2. The image data that is output from the first noise reducing circuit 6 shall be referred to as first image data.

In a manner similar to that described above, the second noise detecting circuit 8 executes noise detection processing and the second noise reducing circuit 9 executes noise reduction processing. Image data output from the second noise reducing circuit 9 shall be referred to as second image data.

Figure 2:
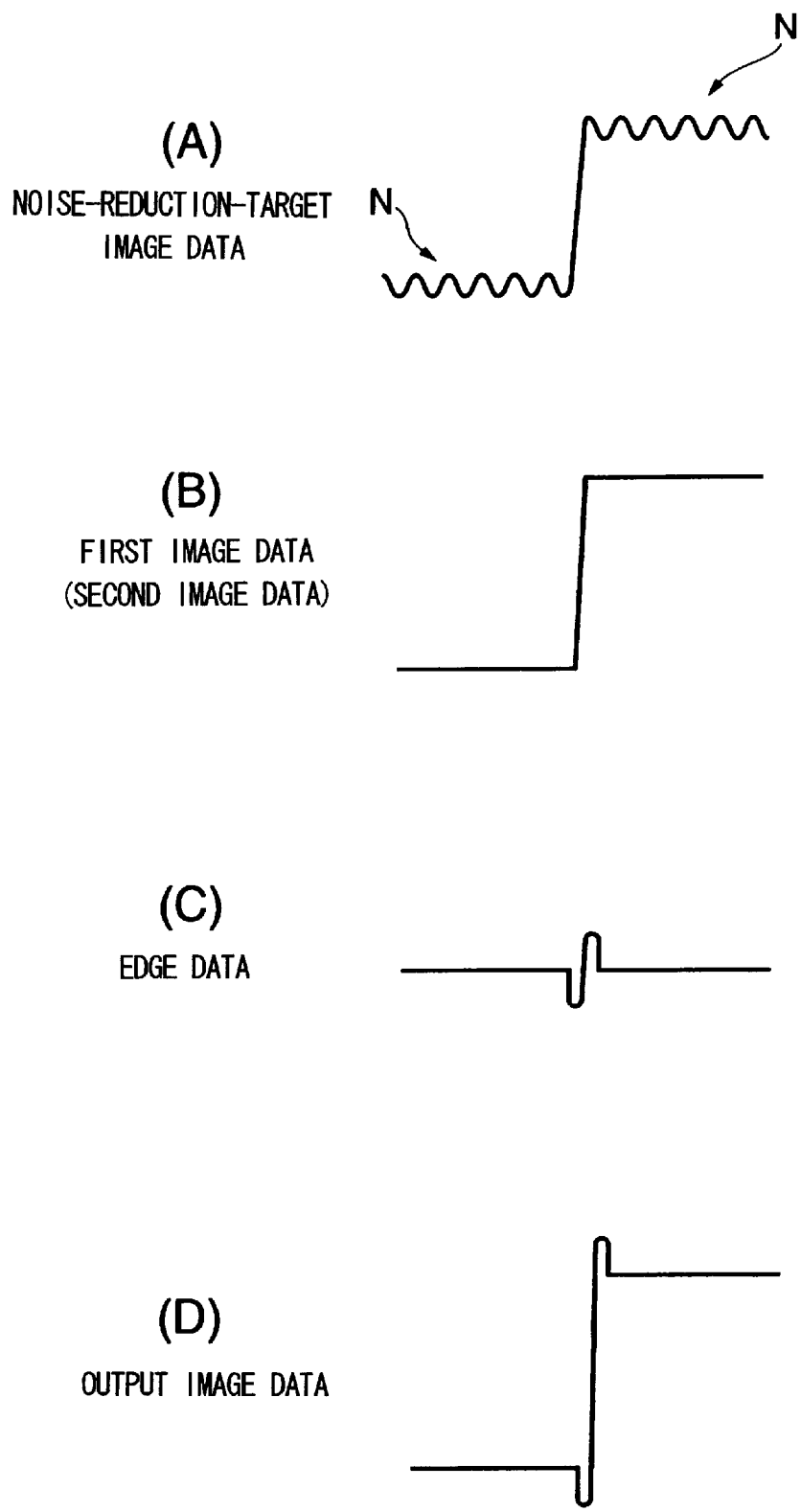
FIGS. 2(A) to (D) illustrate examples of waveforms of data that flow through the circuit of the digital still camera.

The first and second image data are items of data in which noise has been reduced, as shown in (B) of FIG. 2.

The first image data output from the first noise reducing circuit 6 is applied to an edge extracting circuit 7. As shown in (C) of FIG. 2, the edge extracting circuit 7 extracts edge data representing the edge of the image. The extracted edge data is applied to an adding circuit 10.

The second image data output from the second noise reducing circuit 9 also is applied to the adding circuit 10. The latter adds the second image data and the edge data, whereby there is obtained output image data that has undergone noise reduction and edge enhancement [(D) in FIG. 2].

The output image data thus obtained is applied to a display unit, whereby an image in which noise has been reduced and whose apparent image quality has been improved by edge enhancement is displayed. Further, by applying this image to recording medium such as a memory card, the output image data is recorded.

The above-mentioned threshold value may changed for the first noise detecting circuit 5 and second noise reducing circuit 9 or may be the same. Further, the data added to the edge data in the adding circuit 10 may be the noise-reduction-target image data, which has not undergone noise reduction processing, rather than the second image data in which noise has been reduced in the manner described above.

By way of example, when noise is considered to be great, threshold values are set for respective ones of the first noise reducing circuit 6 and second noise reducing circuit 9 in such a manner that noise reduction processing will be executed in both of these circuits. When noise is considered to be neutral, threshold values are set for respective ones of the first noise reducing circuit 6 and second noise reducing circuit 9 in such a manner that noise reduction processing will be executed by the first noise reducing circuit 6 and not by the second noise reducing circuit 9. When noise is considered to be small, threshold values are set for respective ones of the first noise reducing circuit 6 and second noise reducing circuit 9 in such a manner that neither of these circuits will execute noise reduction processing. The threshold value used in the first noise detecting circuit 5 may be made larger than that used in the second noise detecting circuit 8 so that the probability that noise will be detected by the first noise detecting circuit 5 will be made larger than the probability that noise will be detected by the second noise detecting circuit 8. As a result, it is possible to switch between noise reduction processing in the first noise reducing circuit 6 and noise reduction processing in the second noise reducing circuit 9 (the processing adopted conforms to the amount of noise), as set forth above.

In the circuitry described above, the noise detecting circuits and the noise reducing circuits are separate circuits. However, it may be so arranged that both the noise detecting and noise reducing operations are performed by a single circuit. The calculations involving Equations (1) and (2) above and the decisions regarding the threshold values would all be performed by a single circuit.

Figure 4:
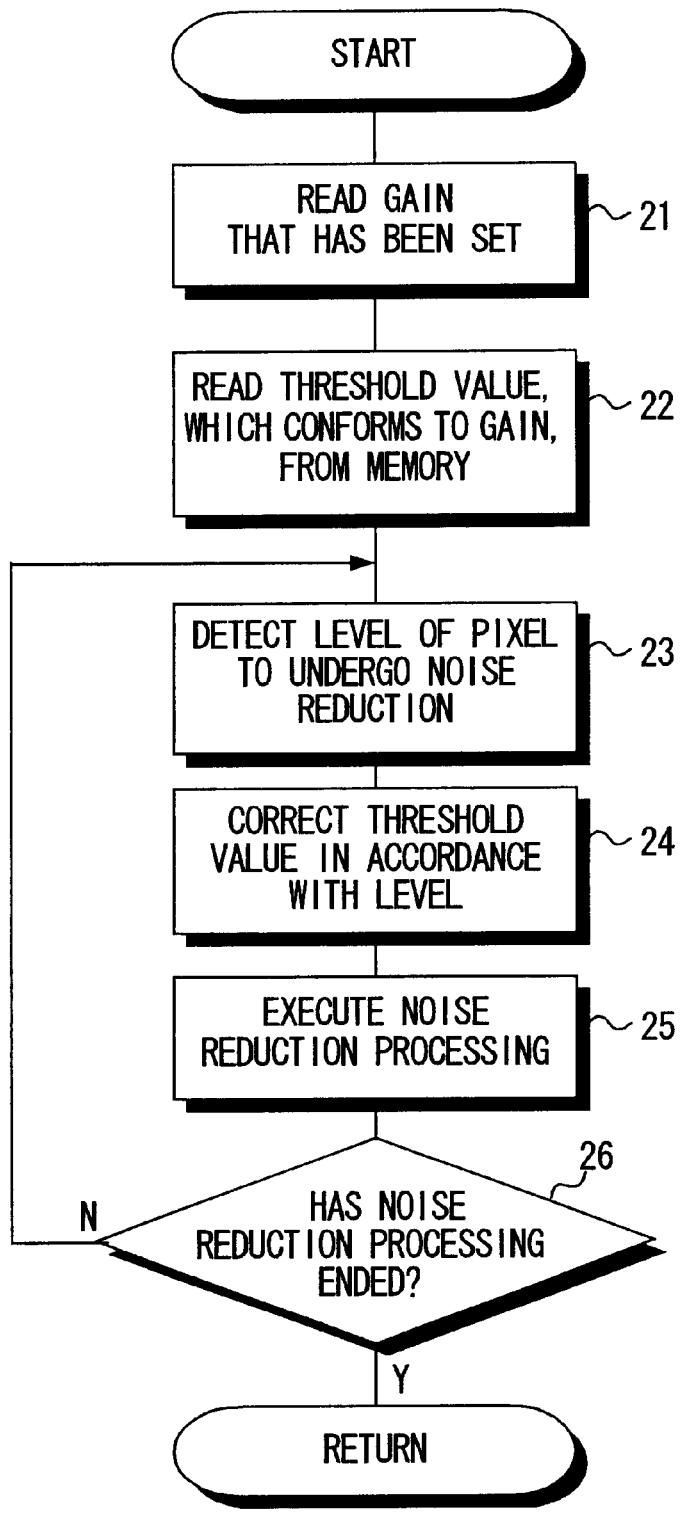
FIG. 4 is a flowchart illustrating processing for reducing noise according to this embodiment of the invention.

FIG. 4 is a flowchart illustrating processing executed when the above-mentioned threshold values are corrected to perform noise reduction processing.

As mentioned above, gain that has been set by the user is read (step 21), whereupon a threshold value conforming to this gain is read out of the memory 13 (step 22). The level of a pixel to undergo noise reduction is then detected (step 23).

The noise-reduction-target image data is subjected to a gamma correction in the signal processing circuit 4, as set forth above. Owing to the gamma correction, image data having a low level experiences an increase in amount of noise in comparison with image data having a high level. If the image data having the high level and the image data having the low level were both to undergo noise discrimination using the same threshold value, then the higher the level, the greater would be the probability that noise is discriminated as being present. For this reason, the threshold value is corrected in such a manner that the higher the level, the smaller the threshold value is made and the lower the level, the larger the threshold value is made (step 24). This means that a noise discrimination malfunction due to a gamma correction can be prevented.

The above-described noise reduction processing is executed using the threshold value thus corrected (step 25) The processing of steps 23 to 25 is repeated until noise reduction processing ends with regard to image data representing one frame's worth of an image (step 26)

As many apparently widely different embodiments of the invention can be made without departing from the spirit and scope thereof, it is to be understood that the invention is not limited to the specific embodiments thereof except as defined in the appended claims.

What is claimed is:

1. A noise reducing apparatus, comprising:

a first noise detecting circuit, to which a noise-reduction-target image signal representing an image to undergo noise reduction is input, for detecting whether the noise-reduction-target image signal includes a noise component to be reduced on the basis of a first threshold value;

a first noise reducing circuit for reducing the noise component and outputting a resultant first image signal when said first noise detecting circuit detects the noise component to be reduced in the noise-reduction-target image signal;

an edge extracting circuit for extracting an edge signal from the first image signal output from said first noise reducing circuit;

a second noise detecting circuit, to which the noise-reduction-target image signal is input, for detecting whether the noise-reduction-target image signal includes a noise component to be reduced on the basis of a second threshold value, the first threshold value in the first noise detecting circuit and the second threshold value in the second noise detecting circuit being set independently from each other;

a second noise reducing circuit for reducing the noise component and outputting a resultant second image signal when said second noise detecting circuit detects the noise component to be reduced in the noise-reduction-target image signal; and an adding circuit for adding the edge signal, which has been extracted by said edge extracting circuit, and the second image signal, which has been output by said second noise reducing circuit and outputting the result.

2. The apparatus according to claim 1, wherein said first noise reducing circuit is such that extent to which the noise component is reduced can be adjusted.

3. The apparatus according to claim 1, wherein said second noise reducing circuit is such that extent to which the noise component is reduced can be adjusted.

4. The apparatus according to claim 1, wherein said first and second noise detecting circuits are physically one device.

5. The apparatus according to claim 1, wherein said first and second noise reducing circuits are physically one device.

6. A noise reducing method, comprising:

detecting whether a noise-reduction-target image signal representing an image includes a noise component to be reduced based on a first threshold value;

reducing the noise component and outputting a resultant first image signal when said detecting step detects the noise component based on the first threshold value;

extracting an edge signal from the first image signal;

detecting whether the noise-reduction-target image signal includes a noise component to be reduced based on a second threshold value, wherein the first threshold value and the second threshold value are set independently from each other;

reducing the noise component and outputting a resultant second image signal when said detecting step detects the noise component based on the second threshold value; and adding the edge signal and the second image signal and outputting the result.

7. The method according to claim 6, further comprising adjusting an extent to which the noise component is reduced for the first image signal.

8. The method according to claim 6, further comprising adjusting an extent to which the noise component is reduced for the second image signal.

* * * * *